United States Patent
Kerr

[19]
[11] 3,727,050
[45] Apr. 10, 1973

[54] GAS ANALYZER
[75] Inventor: Edwin L. Kerr, Ridgefield, Conn.
[73] Assignee: The Perkin-Elmer Corporation, Norwalk, Conn.
[22] Filed: Sept. 20, 1971
[21] Appl. No.: 181,975

[52] U.S. Cl. ...................250/43.5 R, 250/83.3 R
[51] Int. Cl. ...................H01j 37/00, G01m 21/12
[58] Field of Search ...................250/43.5 R, 86; 356/201

[56] References Cited

UNITED STATES PATENTS

| | | | |
|---|---|---|---|
| 3,562,524 | 2/1971 | Moore et al. | 250/43.5 R |
| 3,384,749 | 8/1965 | Golay | 250/43.5 R |
| 3,227,873 | 1/1966 | Liston | 250/43.5 R |
| 3,014,129 | 12/1961 | Martain | 250/43.5 R |

*Primary Examiner*—James W. Lawrence
*Assistant Examiner*—B. C. Anderson
*Attorney*—Edward R. Hyde, Jr.

[57] ABSTRACT

A gas analyzer for determining the presence and proportional amount of gases of interest in a sample, such as a sample of automobile exhaust gas, utilizes a very thin cell having a window in one side to admit chopped radiation, such as infrared radiation of a wavelength coinciding with an absorption band of the gas of interest. Heat absorbed from the applied radiation by a gas component of interest increases its temperature and hence increases the pressure of the sample. This pressure increase is measured to determine the proportional amount of a gas of interest present by means of the modulated output of a low-frequency microphone associated with the cell. The thickness of the cell is from about 0.1 mm. to about 4 mm.; with a cell this thin the heat loss to the window and to the back wall is so rapid that a slow chopping rate can be applied such that absorption of radiation by the gas of interest approaches a steady state during the sample illuminating portion of the chopping cycle. The measured concentration is thus independent of small variations in the chopping rate. Even a very small quantity of a gas of interest is measured rapidly and accurately. Specificity is facilitated by initially reducing the pressure of the sample in the cell to a fraction of an atmosphere, for example, one tenth. When the pressure is thus reduced, a method is provided for selecting a new cell thickness or chopping rate such that there is little loss in sensitivity at the reduced pressure.

This invention relates to gas analyzers for analyzing gas mixtures, and is of the general type in which absorption of radiation by a component of interest is detected and measured as means for determining the presence of such component and measuring the proportional amount present. In particular the invention is an analyzer which is particularly adapted for rapidly and accurately detecting and measuring very low concentrations of gases of interest which may be present in the mixture.

The gas analyzer of this invention is simple to operate and economical to manufacture. It is, for example, particularly suited for quick, on the spot analysis of automobile exhaust gases for reliably and inexpensively checking compliance with air pollution control standards for automobile exhaust emissions.

14 Claims, 2 Drawing Figures

GAS ANALYZER

BACKGROUND OF THE INVENTION

Absorption of radiation by a component gas of interest in a mixture is used as means for detecting and measuring gas mixture components in a variety of well known types of gas analyzers. In general, radiation of a wavelength coinciding with an absorption band of the component gas of interest is applied through a suitable window to a sample of the gas mixture in an absorption cell. In accordance with one widely used technique the amount of radiation absorbed is measured by comparing the amount of radiation applied to the amount of radiation emerging from the cell after passing through the sample.

In known gas analyzers of the aforementioned absorption type, the length of the cell which defines the path of the radiation through the sample is customarily made relatively long in comparison with the lateral dimensions of the cell in order to expose a sufficient quantity of the gas of interest to the radiation to obtain an accurate reading when the relative concentration of the component of interest is low. However, when a conventional long cell is used to analyze a sample of gas having a relatively high concentration of the component of interest, the absorption causes a reduction of the intensity of the radiation toward the downstream end of the radiation path. This decreases the accuracy and precision of the measurement. In some types of gas analyzers means are provided to vary the path length to overcome this difficulty, but with an attendant increase in their complexity and cost and the skill required to obtain accurate readings from them.

In accordance with another known technique the amount of radiation absorbed is determined by measuring the increase in pressure of the sample resulting from absorption of radiation by the component of interest; the absorption of radiation by the component of interest increases the temperature and, hence the pressure of the sample. The amount of the pressure increase is directly proportional to the amount of the component of interest present, so that a suitably calibrated meter, reading in percent for example, may easily be provided for direct reading of the analysis.

In known gas analyzers of the aforementioned pressure sensing type, the ambient pressure is directly related to the sensitivity. It is generally known to persons skilled in the art that the sensitivity will be decreased if the ambient pressure is decreased, while the specificity may be increased under certain conditions of overlapping of absorption lines with other, interferring gases.

Previously known gas analyzers customarily use either a laser source or a selectively filtered incoherent source with collimated optics for applying a concentrated beam of radiant energy to a sample in the cell.

SUMMARY OF THE INVENTION

A principal object of the present invention is to provide an economical absorption type gas analyzer which will rapidly and accurately detect and measure a low concentration of a gas component of interest in a sample and which is simple to operate.

Another object is to provide a gas analyzer of the subject type which is adapted to be operated with an incoherent source of radiation and without having to utilize collimating optics.

A further object is to provide a gas analyzer of this type which is adapted to successively detect and measure a number of different components of the sample by the substitution of different radiation band-pass filters.

The gas analyzer of the present invention incorporates an absorption cell which is very thin in relation to its other dimensions and which has a window in one side to admit radiation of a selected wavelength coinciding with the absorption band of the gas component of interest in a sample in the cell. The radiation is applied from an incoherent source, such as a source of infrared radiation. The area of the window is the major portion of the area of the cell side wall which includes the window and the size of the radiation source in comparison with the area of the window is such that radiation from the source passes into the cell over the major portion of the area of the window. This arrangement permits effective operation without the expense of a laser source or of collimated optics. The window is placed close to the source to subtend a large solid angle at the source, that is, to make the window a very large aperture. An aperture of $f/1$ more or less is practical. A reflector behind the source collects additional radiation and directs it to the cell window. This arrangement permits utilization of a much greater fraction of the radiation emitted by the source than is possible with collimating optics and conventional long path cells. The thickness of the cell which is in the range of from about 0.1 mm. to about 4 mm., and preferably about 2 mm. is sufficiently small in comparison with the other dimensions that heat flow within the cell across the thin dimension of the cell is so great in comparison with the heat flow across the other dimensions of the cell that the heat flow is essentially one-dimensional. The thin dimension is made sufficiently small so that the chopping period can be made typically six heat flow time constants long while still maintaining a reasonable chopping rate of 0.5 to 20 cycles per second, preferably about 10 cycles per second, when the ambient pressure is about one atmosphere. The measurements may thus be taken of the pressure increase when the temperature increase reaches a steady state, which measurement translates directly into proportion of the gas of interest present. In addition, due to the relative thinness of the cell, the measured pressure increase is independent of small fluctuations in the chopping rate.

In the preferred form of the invention the radiation applied to the absorption cell is chopped and the pressure rise is measured by means of a capacitance microphone and electronics which sense changes in the capacitance of the microphone due to pressure changes and produce accentuated, smoothed-out output signals which are proportional to changes in the capacitance and hence, to changes in the pressure. These output signals are applied to a meter which is calibrated to indicate the pressure changes in terms of the proportion of the component gas of interest present in the sample.

The intensity of the radiation is selected to cause a measurable pressure rise when the concentration in the sample of the gas of interest is the lowest value that is desirable to measure. Pressure rises as small as $10^{-8}$ atmosphere are measurable using microphones of known construction. The chopping frequency is selected so that the temperature rise due to the absorption of radiation by the component gas of interest at least closely approaches a steady state within half the chopping period. A chopping frequency on the order of 10 Hz and a 17 watt source of infrared radiation filtered to produce radiation of a wavelength coinciding with the absorption band of $CO_2$, for example, suitably enables an analyzer of this invention to detect and measure $CO_2$ in automobile exhaust gas with an equivalent noise level of about 15 parts per million, using only a very insensitive microphone.

In order to prevent overlapping of gas absorption lines and to ensure specificity the pressure of the sample in the cell may be reduced below an atmosphere, a pressure of 0.1 atmosphere being suitable to reduce pressure broadening of the absorption lines to an appreciable extent.

DESCRIPTION OF THE DRAWINGS

Further objects, advantages and features of a gas analyzer in accordance with the present invention will be apparent from the following more detailed description of an illustrative embodiment shown in the accompanying drawings, in which.

DETAILED DESCRIPTION

Figure 1:
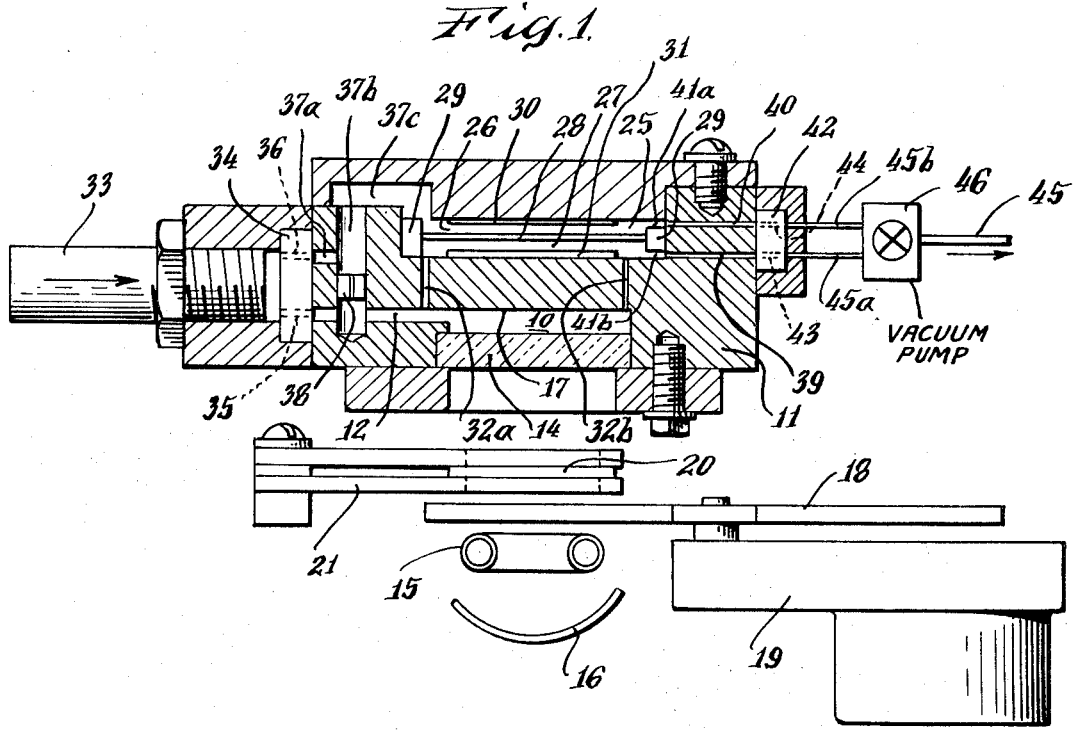
FIG. 1 is a cross-sectional view longitudinally through a gas analyzer of this invention, part of the analyzer being illustrated schematically.

Referring to the drawings, a gas analyzer of this invention essentially includes a thin absorption cell 10 in an analyzer body 11 with an inlet conduit 12 to the cell 10, and an outlet passage, subsequently described. One side wall of the cell 10 is formed by a window 14 of glass, or other suitable transparent material such as a polished crystalline material, adapted to pass radiation of a wavelength coinciding with the absorption band of a component gas of interest which may be present in a gas sample in the cell. A source 15 of radiation such as a lamp as illustrated is placed to apply radiation into the cell 10 through the window 14 over the major portion of the area of the window. A curved reflector 16 in back of the lamp causes as much radiation from the source as possible to be directed into the cell. The back wall surface 17 of the cell opposite the window 14 is preferably polished so as to reflect radiation impinging thereon back through the sample in the cell.

The thickness of the interior of the cell 10 from the inner surface of the window 14 to the opposite back wall surface 17 is made quite small in relation to the diameter of the cell. Diameter as used herein is the actual diameter if the cell is circular; if the cell is square or rectangular, the term diameter refers to a dimension equal to one half the sum of the length and the width. In accordance with the invention the thickness of the cell is from about 0.1 mm. to about 4 mm., and is preferably about 2 mm.; the ratio of the interior diameter of the cell to its interior thickness is greater than 3. The interior diameter is suitably such that the interior cross-sectional area of the cell is from about 1 to about 2 $cm^2$. The relative length and width or diameter of the cell are not particularly critical and are determined by the area over which the particular lamp selected for the radiation source 15 will apply radiation of suitable intensity. For example, with a 30 watt 5 amp. microscope illuminator lamp adapted to produce infrared radiation spaced about 3 cm. from the window of a rectangular cell, the width of the cell would suitably be on the order of about 12 mm. and the length would be on the order of about 25 mm.

The normal thickness of the window 14 and of the walls of the analyzer body 11 necessary for structural stability give them a much greater heat capacity than the heat capacity of a gas within the cell 10 (at least a thousand times greater) so that the temperature rise of the window and body structure is negligible for the time it takes the temperature, and hence pressure, of a sample in the cell to reach a steady state when the cell is irradiated in the manner described.

Radiation applied to the cell 10 from the source 15 is chopped into approximately equal periods of illumination and non-illumination by a rotating chopper blade 18 intersecting the path of radiation from the source 15 and driven by a suitable motor indicated at 19.

This radiation is also filtered to block all radiation except that having the particular wavelength coinciding with a selected absorption band of the gas of interest which may be present in the sample in the cell. The selected absorption band is chosen on the basis of such factors as its strength (i.e., both its absolute strength and its relative strength compared with absorption bands of other gas components which may be present in various concentrations in the sample) and the availability and expense of suitable sources and window materials emitting and transmitting the corresponding wavelength. This filtering is provided by a filter 20 supported in the path of radiation from the source 15 to the window 14 by a filter holder 21 in which a filter 20 is removably supported so as to be replaceable by alternative filters for other selected wavelengths for detecting and measuring different component gases of interest in the sample. The filter holder 21 may be a fixed holder in which different filters 20 are inserted or removed, or it may be a rotatable disc supporting a number of selected filters to be positioned alternatively in the path of radiation. Alternatively or as a supplement the filter may be provided by an appropriate gas filter cell.

Changes in pressure of a sample gas in the cell 10 due to absorption of radiation by a component of interest are detected and measured by means of a microphone 25 which may be of known construction, either as a separate element connected to the body of the analyzer or, as illustrated, incorporated in the body 11. The illustrated capacitance microphone 25 consists of a chamber separated into two adjacent substantially equal volume compartments 26 and 27 by a flexible membrane 28 of electrically conductive material. The membrane 28 is supported in the chamber defined by the compartments 26,27 by having its edges seated or embedded in a ring 29 of electrical insulating material around the interior wall of the chamber for electrically insulating the membrane 28 from the body of the analyzer. A pair of capacitor plates 30 and 31 are arranged respectively in the compartments 26 and 27, to be spaced from opposite sides of the membrane 28, and electrically insulated from the body of the analyzer. The membrane 28 and capacitor plates 30,31 are connected to suitable electronics for detecting and measuring changes in capacitance and, hence, changes in pressure as subsequently described in detail. The compartment 27 is in fluid flow communication with the absorption cell 10 by a pair of passages 32a and 32b. Passage 32a goes from the left end of the compartment 27 into the inlet conduit of the absorption cell; passage 32b goes from the right end of compartment 27 into the right end of the cell. The passages 32a and 32b are made large enough for some of the gas flowing into the cell 10 to flow fairly freely into compartment 27 and for pressure changes of the gas in cell 10 to apply substantially simultaneously to the portion of the sample gas in compartment 27.

A sample of gas to be analyzed is fed into the analyzer through an inlet tube 33 which is suitably connected into the body 11. A slide valve 34 is mounted to slide in a suitable guide way on the body 11 and has passages 35 and 36 through it. When the valve 34 is in open position, input gas in the inlet tube 33 flows through the valve passage 35 and through inlet conduit 12 into the cell 10; some of the gas going directly to the cell 10 also flows into the compartment 27 through the passages 32a and 32b. At the same time another portion of the inlet gas flows through the other valve passage 35 and then into the compartment 26 of the capacitance microphone 25 through interconnected inlet conduit sections 37a, b and c. The passages 35 and 36 through the valve 34, the inlet conduit 12, the passages 32a, b interconnecting cell 10 and compartment 27 and the inlet conduit sections 37a, b and c are dimensioned so that input gas flows at substantially the same pressure into the compartment 26 and into the cell 10 and compartment 27.

As shown, the inlet conduit section 37b to the compartment 26 also extends down into the inlet conduit 12 to the cell 10. A capillary leak element 38 is mounted in this conduit section 37b below the inlet conduit section 37a in order to cause the pressure of sample gas in the cell 10 and compartment 27 to equalize to the pressure of sample gas in the compartment 26 within a few moments after the inlets and outlets of the analyzer are closed. The dimension of the capillary leak provided by the capillary leak element 38 is made sufficiently small so that its time constant is long in comparison with the time required for the temperature and pressure rise of a sample gas in the cell 10 to reach a steady state when radiation is applied; thus a pressure rise produced in the sample gas in the compartment 26 by leakage through the capillary leak element 38 is so slight as to have no appreciable effect on the accuracy of pressure readings recorded by the analyzer.

The outlet from the absorption cell 10 is formed by the passage 32b into the compartment 27 from which the gas exhausts through an outlet conduit 39. Sample gas from the other compartment 26 of the capacitance microphone 25 exhausts through an outlet conduit 40. The outlet conduits 39 and 40, which open into the compartments 27 and 26, respectively, through holes 41a, 41b through the insulating ring 29, are opened and closed at their outer (right) ends by an outlet slide valve 42 which, in its open position, has two passages 43 and 44 through it to connect the outlet conduits 39 and 40 with a pair of outlet tubes 45a and 45b. The outlet tubes 45a and 45b are connected through a vacuum pump 46 to a single outlet tube 45, the vacuum pump 46 being provided as means for reducing the pressure of sample gas in the analyzer and to facilitate removal of sample gas from the analyzer after a particular sample has been analyzed. Alternatively the outlet tubes 45a and 45b may exhaust into the atmosphere while the sample gas is applied to the inlet conduit 33 at a pressure somewhat above atmospheric pressure, so as to introduce the sample into the analyzer by displacement.

The inlet slide valve 34 and the outlet slide valve 42 may be constructed either to simply open and close the inlet and outlet of the analyzer or may be constructed to provide a third alternative to their full open and full closed positions in which alternative passages through the valves provide capillary leaks having sufficiently long time constants in relation to the temperature-pressure rise time of a sample gas being irradiated that the inlet and outlet are in effect closed as means for providing detection and measurement of a continuous sampling of gas.

The function of the valves in this invention may also be accomplished by other types of valves of known construction.

Figure 2:
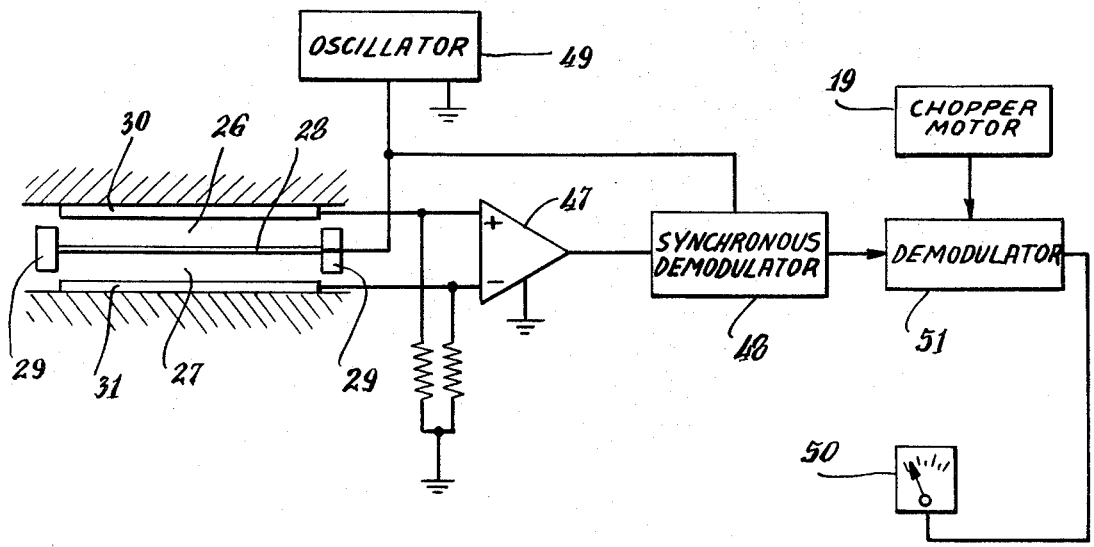
FIG. 2 is a schematic diagam of a capacitance microphone and associated electronics for detecting and measuring pressure changes of the sample in the cell due to the absorption of radiation by the gas of interest in the sample.

FIG. 2 illustrates suitable electronics connected to the capacitance microphone 25 for sensing and indicating measurements of the proportional amount of a gas of interest present in the sample being analyzed. As shown, the capacitor plates 30 and 31 in the respective compartments 26 and 27 are connected respectively to the inputs of a summing amplifier 47 which produces an amplified output proportional to the difference between the capacitance of plate 30 and membrane 28 and plate 31 and membrane 28 and applies this output to a synchronous demodulator 48. An oscillator 49 is connected to apply oscillating signals to the membrane 28 and to the synchronous demodulator 48 which is synchronized with the oscillator 49. The output signals from the synchronous demodulator 48 which are a sequence of saw-toothed signals proportional to the changes in capacitances from the capacitance microphone 25 are accentuated, smoothed out and rectified to facilitate their application to a meter 50 by a demodulator 51 which is connected to receive the output of the synchronous demodulator 48 and a reference signal from the chopper motor 19 which is adapted to produce output signals in timed relation with the illumination of the cell 10 by the light source 15 at the portions of the cycles of the chopper motor blade 18 during which the blade permits radiation to pass to the cell. The output signals from the demodulator 48 are thus demodulated by the demodulator 51 with reference to the cyclic operation of the chopper blade 18 and applied to the meter 50. The signals received by the meter 50 are thus proportional to the differences in capacitances of the two capacitor portions of the capacitance microphone 25 and, hence, are proportional to changes in pressure of a sample gas in the cell 10. The meter 50 is suitably calibrated to indicate the differences in capacitances as percent of the component of interest present in the sample analyzed.

In conventional analyzers having relatively elongated (i.e., thick) cells, the effect of the reduction in intensity of the radiation as the radiation proceeds through the gas in the cell, and the consequent non-uniformity of illumination throughout the length of the path of illumination through the cell, reduces the range of absorptivities of sample gases over which accurate readings can be made. In order to obtain accurate readings with such cells, the effects of intensity reduction and non-uniform illumination must be compensated for mathematically, and sometimes requires a cell with an adjustable path length, which increases the complexity of the construction and operation of the instrument. On the other hand, with an analyzer of the present invention, having a relatively thin cell 10, whose dimensions are within the range previously described, the length of the path of radiation through the cell is so short that the slight reduction in intensity of the radiation passing through the gas in the cell does not noticeably reduce the accuracy of the output readings over a wide range of absorptivities from about $1^{-1}$ cm$^{-1}$ to about $10^{-7}$ cm$^{-1}$ or less.

The radiation is preferably chopped, and the output of the microphone is modulated and demodulated by the associated electronics as described above, in order to provide a sequence of clear readings. The chopping frequency is therefore adjusted in relation to the time required for the pressure rise to a substantially steady state during the illuminating portion of the chopping cycle and to be compatible with maximum or close to maximum modulation of the signals from the microphone.

An appropriate chopping frequency is suitably determined from a formula for a principal time constant, $t$, for this pressure rise as follows:

$$t = L^2 \rho \, C_v / \pi^2 K, \text{ where}$$

$L$ is the length of the radiation path through the gas sample, i.e., the thickness of the absorption cell 10;
$\rho$ is the gas density of the gas sample;
$C_v$ is the specific heat capacity of the gas sample at constant volume; and
$K$ is the gas sample thermal conductivity.

This time constant t is suitably determined with reference to any one of the several gases of interest for which a gas sample is to be analyzed. The chopping frequency which need not be exact may then be selected to be on the slow side relative to the pressure rise so that by utilizing alternative filters 20 a gas sample may be examined to successively detect and measure amounts of a number of different components of interest. Normally when the analyzer is used to detect small quantities of gases of interest mixed with air, as in the case of detecting and measuring air pollutants, the appropriate density, specific heat capacity, and thermal conductivity are the values for air. A single chopping frequency is therefore appropriate for detecting several air pollutants. For example, for 95 percent modulation of the microphone output, the chopper frequency is preferably adjusted to allow three time constants for the pressure rise portion, i.e., illumination portion of the chopper cycle and three time constants for the non-illuminated portion of the cycle during which the pressure falls. Thus the chopping frequency is set at $f = 1/(6tay)$.

The formula for the principal time constant is proportional to the gas density. If the sample gas is rarefied to one-tenth the normal atmospheric density, the time constant becomes one-tenth as large and the appropriate chopping frequency increases by a factor of 10. If the mixture of the gas of interest and air is in a fixed ratio, the total quantity of gas of interest in the cell is also reduced by a factor of 10. This means the total input of heat to the gas per unit time interval by absorption will be reduced by a factor of 10. Normally the conductivity of air remains approximately constant until pressures of the order of one one-hundreth of an atmosphere are achieved. Therefore the steady-state temperature rise $\Delta T$ is reduced by a factor of 10. However, in the present invention the microphone detects the pressure rise $\Delta P$, according to the ideal gas law $$\Delta P/P = \Delta T/T$$

where $T$ is the nominal absolute ambient temperature and $P$ is the nominal absolute pressure. As both $\Delta T$ and $P$ have each been reduced by a factor of 10, the measured $\Delta P$ is reduced by a factor of 100.

The minimum detectable absorptivity is proportional to some fixed pressure amplitude A relative to $P$, so when $\Delta P/P$ is reduced by a factor of 10, the minimum detectable absorptivity increases by a factor of 10. This difficulty is common to analyzers of the aforementioned pressure sensing type as well. If the cell is now made longer by a factor of the square root of 10, the time constant is reduced by a factor of 10 to its former value. Also, the steady state average absolute temperature rise is proportional to the length squared, so the temperature rise returns to its former value also. The minimum detectable absorptivity therefore remains unchanged over a 10 to 1 pressure variation if the cell length is simultaneously changed in the ratio 1 to the square root of 10. A method and procedure is therefore given to design an analyzer whose minimum detectable absorptivity is independent of the operating pressure over a range from about 10 atmospheres or more to about one one-hundredth of an atmosphere. In some applications it may be particularly useful to design the analyzer for a low operating pressure, to minimize the pressure broadening and overlapping of absorption lines of various gases of interest and thus to improve the specificity of the analyzer over that of other types of analyzers without an attendant loss in sensitivity.

What is claimed is:

1. A gas analyzer for determining the proportional amount of a gas of interest in a sample comprising a thin cell having an inlet and an outlet for a gas sample, means for at least partially closing the inlet, means for at least partially closing the outlet, said cell having a window in one side wall for admitting radiation of wavelength coinciding with the absorption band of a gas of interest, the area of said window being the major portion of the area of said side wall, the interior diameter of the cell being substantially greater than the interior thickness of the cell from the window to the opposite side wall, said thickness being from about 0.1 mm. to about 4 mm., a source of radiation of a wavelength coinciding with an absorption band of said gas of interest positioned for applying radiation through said window to a sample gas in the cell, the size and position of the radiation source in relation to the area of the window being such that radiation from the source passes into the cell over the major portion of the area of the window, cyclic means for blocking the passage of radiation into the cell from the source during a portion of each cycle thereof, and means responsive to a change in the physical conditions of sample gas in the cell due to absorption of radiation by said gas of interest as means for determining the proportion of said gas of interest in the sample, the frequency of said cyclic means being selectable with regard to the expected thermal conductivity, temperature, and pressure of the sample gas in order that the changes in temperature and pressure of the sample gas due to absorption of said radiation by said gas of interest in the cell at least nearly reach a steady state in the portion of each cycle thereof during which said radiation passes into the cell.

2. The gas analyzer of claim 1 in which said means responsive to a change in the physical conditions of sample gas in the cell is means for measuring change in the pressure of the sample.

3. The gas analyzer of claim 2 including means for reducing the pressure of a sample gas in the cell to less than an atmosphere.

4. The gas analyzer of claim 1 in which the ratio of the interior diameter of the cell to its interior thickness is greater than 3.

5. The gas analyzer of claim 4 in which said interior thickness of the cell is about 2 mm.

6. The gas analyzer of claim 1 which includes a narrow band-pass filter between said radiation source and the cell for passing only a radiation wavelength coinciding with an absorption band of said gas of interest.

7. The gas analyzer of claim 6 in which said source is a source of infrared radiation.

8. The gas analyzer of claim 1 in which the inlet and the outlet of the cell each includes capillary leak means for reducing the inlet and outlet flow to an amount such that changes in temperature and pressure due to absorption of said radiation by sample gas in the cell at least nearly reach a steady state during that portion of one cycle of the cyclic radiation blocking means during which said radiation passes into the cell.

9. The gas analyzer of claim 1 in which said means for determining the proportion of a gas of interest in a sample in the cell comprises a capacitance microphone which includes a capacitor formed by two electrically conductive surfaces defining walls of a compartment and being movable relative to each by changes in the pressure of a gas in the compartment so as to effect a proportional change of capacitance, said compartment being connected to the cell to produce a change in capacitance in proportion to changes in the pressure of the sample gas in the cell, means to sense said change in capacitance, and means to measure such change in capacitance.

10. The gas analyzer of claim 1 in which the interior surface of the cell side wall opposite the window is a reflective surface for reflecting said radiation.

11. The gas analyzer of claim 1 including a capacitance microphone connected for determining the proportion of a gas of interest in a sample in the cell, said capacitance microphone comprising a chamber separated into a first and a second compartment by a flexible electrically conductive membrane and a pair of capacitor plates respectively in the compartments, inlet means for introducing a sample gas into the first compartment, said first compartment having a closable gas outlet, conduit means between the second compartment and the interior of the cell for sample gas in the cell to flow into the second compartment and for a change in pressure in gas in the cell to be communicated to gas in the second compartment within the portion of one cycle of said cyclic means during which said radiation passes into the cell, means for initially equalizing the gas pressure in the first compartment with the gas pressure in the cell and in the second compartment before application of said radiation to gas within the cell, means connected to sense the changes of capacity respectively of said capacitor plates and said membrane by deflection of the membrane, means connected to sum said changes of capacity, means connected to produce electrical signals proportional to the sum of said changes of capacity, and means to measure the value of said signals.

12. The gas analyzer of claim 11 in which said means for initially equalizing the gas pressure in the first compartment with the gas pressure in the cell and in the second compartment comprises a capillary leak connection between the interior of the cell and the second compartment, the time constant of said capillary leak being relatively long in comparison with the time of the portion of a cycle of said cyclic means during which said radiation passes into the cell.

13. The gas analyzer of claim 11 including an oscillator connected to apply a modulated electric signal to said flexible membrane, a summing amplifier connected to said capacitor plates for summing the changes of capacity respectively of the capacitor plates and the membrane and for producing output signals proportional to such sum, a first synchronous demodulator connected to receive the modulated signal from the oscillator and the output signals from the summing amplifier for producing output signals proportional to the sum of said changes in capacity, and means for measuring the output signals of the synchronous demodulator.

14. The gas analyzer of claim 13 in which said means for measuring the synchronous demodulator output signals comprises means producing cyclic output electric signals in timed correspondence with the cyclic operation of said cyclic radiation-blocking means, a second demodulator connected to receive said cyclic output signals and the output signals from said first demodulator for smoothing out and accentuating the output signals from the first demodulator, and a meter connected to measure said smoothed out and accentuated signals from the second demodulator.

* * * * *